(12) United States Patent
Chen et al.

(10) Patent No.: US 10,637,298 B2
(45) Date of Patent: Apr. 28, 2020

(54) WIRELESS POWER TRANSFER SYSTEM

(71) Applicant: Hong Kong Applied Science and Technology Research Institute Company Limited, Hong Kong (CN)

(72) Inventors: Ziang Chen, Hong Kong (CN); Jun Chen, Hong Kong (CN); Hang Sang Lee, Hong Kong (CN)

(73) Assignee: HONG KONG APPLIED SCIENCE AND TECHNOLOGY RESEARCH INSTITUTE COMPANY LIMITED, Hong Kong (CN)

( * ) Notice: Subject to any disclaimer, the term of this patent is extended or adjusted under 35 U.S.C. 154(b) by 87 days.

(21) Appl. No.: 15/896,086

(22) Filed: Feb. 14, 2018

(65) Prior Publication Data

US 2019/0252918 A1    Aug. 15, 2019

(51) Int. Cl.
*H02J 50/05*        (2016.01)
*H02J 50/12*        (2016.01)

(52) U.S. Cl.
CPC ............... *H02J 50/12* (2016.02); *H02J 50/05* (2016.02)

(58) Field of Classification Search
CPC .................................. H02J 50/05; H02J 50/12
USPC ............. 307/104; 315/279, 291; 263/34, 37, 263/56.01–56.05, 74, 95–97, 131–132
See application file for complete search history.

(56) References Cited

U.S. PATENT DOCUMENTS

| | | | |
|---|---|---|---|
| 6,016,258 A | * | 1/2000 | Jain .................... H02M 1/38 363/17 |
| 7,719,356 B2 | | 5/2010 | McMorrow |
| 8,643,326 B2 | | 2/2014 | Campanella et al. |
| 9,705,545 B2 | | 7/2017 | Connell et al. |

(Continued)

FOREIGN PATENT DOCUMENTS

| | | |
|---|---|---|
| CN | 104617646 A | 5/2015 |
| CN | 104702113 A | 6/2015 |

(Continued)

OTHER PUBLICATIONS

Hiroo Sekiya,etc,"New Control Scheme for Class DE Inverter by Varying Driving Signals," IEEE Transactions on Industrial Electronics, vol. 47, No. 6, Dec. 2000.

*Primary Examiner* — Rexford N Barnie
*Assistant Examiner* — Toan T Vu
(74) *Attorney, Agent, or Firm* — Eagle IP Limited; Jacqueline C. Lui

(57) ABSTRACT

A wireless power transfer system with a class DE inverter for power transfer to a load. The wireless power transfer system includes a half-bridge circuit, a zero voltage switching (ZVS) tank, a shunt capacitor array, an evaluation circuit, and a controller. The half-bridge circuit has two transistors connected in series with each of the two transistors driven by a gate driving signal with a duty cycle. The ZVS tank and the shunt capacitor array are electrically connected with the half-bridge circuit. The ZVS tank includes two capacitors and an inductor. The shunt capacitor array has a capacitance that is tunable. The evaluation circuit calculates a power conversion efficiency of the system. The controller receives the power conversion efficiency from the evaluation circuit and generates control signals to adjust the duty cycle of the gate driving signal and to adjust the (Continued)

capacitance of the shunt capacitor array in order to maximize the power conversion efficiency of the system.

11 Claims, 7 Drawing Sheets

(56) References Cited

U.S. PATENT DOCUMENTS

| | | | |
|---|---|---|---|
| 2011/0193416 A1* | 8/2011 | Campanella | H01Q 7/00 307/104 |
| 2014/0152250 A1 | 6/2014 | Vijayan et al. | |
| 2015/0061577 A1* | 3/2015 | Ye | H02J 7/025 320/108 |
| 2015/0069855 A1 | 3/2015 | De Rooij et al. | |
| 2016/0268832 A1 | 9/2016 | Chandrakasan et al. | |
| 2017/0271924 A1 | 9/2017 | Mao et al. | |
| 2018/0301934 A1* | 10/2018 | Prabhala | H02J 50/12 |

FOREIGN PATENT DOCUMENTS

| | | |
|---|---|---|
| CN | 104779714 A | 7/2015 |
| CN | 107548536 A | 1/2018 |
| WO | 2017052158 A1 | 3/2017 |

\* cited by examiner

WIRELESS POWER TRANSFER SYSTEM

FIELD OF THE INVENTION

The present invention relates to a wireless power transfer system that supplies power to a load.

BACKGROUND

Wireless power transfer systems provide a convenient, safe, and reliable way to charge and power electrical devices. Traditionally, the inverters or amplifiers of the wireless power transfer system are ZVS class D inverters. The ZVS class D inverters achieve a relatively stable overall power conversion efficiency of the system. Class DE inverters can further improve the power conversion efficiency of the wireless power transfer system at a certain load impedance, but the overall power conversion efficiency cannot maintain a stable value. A major challenge of class DE inverters is how to keep the power conversion efficiency at a high level when the load impedance varies.

New methods and systems that provide improved power conversion efficiency from the wireless power transfer system to the load will assist in advancing technological needs and solving technological problems in the field of wireless power transfer.

SUMMARY OF THE INVENTION

One example embodiment is a wireless power transfer system with a class DE inverter for power transfer to a load having an impedance that is variable. The wireless power transfer system includes a half-bridge circuit, a zero voltage switching (ZVS) tank, a shunt capacitor array, an evaluation circuit, and a controller. The half-bridge circuit has two transistors connected in series with each of the two transistors driven by a gate driving signal with a duty cycle. The ZVS tank and the shunt capacitor array are electrically connected with the half-bridge circuit. The ZVS tank includes two capacitors and an inductor. The shunt capacitor array has a capacitance that is tunable. The evaluation circuit calculates a power conversion efficiency of the system. The controller receives the power conversion efficiency from the evaluation circuit and generates control signals to adjust the duty cycle of the gate driving signal and to adjust the capacitance of the shunt capacitor array in order to maximize the power conversion efficiency of the system.

Other example embodiments are discussed herein.

DETAILED DESCRIPTION

Figure 1:
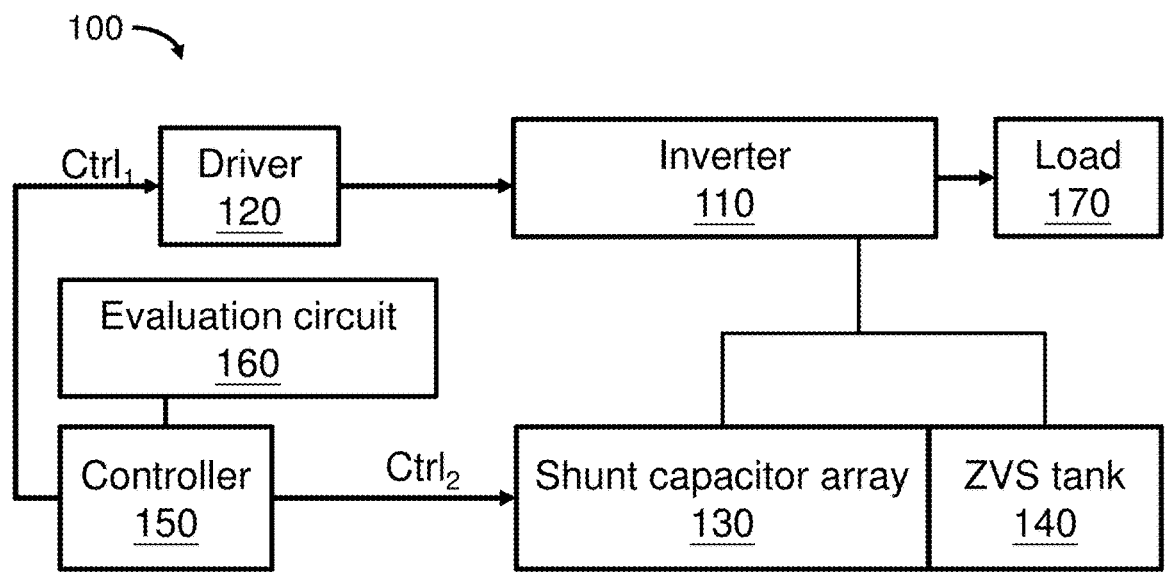
FIG. 1 shows a block diagram of a wireless power transfer system in accordance with an example embodiment.

Example embodiments relate to wireless power transfer systems or wireless power transmitters and methods that supply power to a load wirelessly with maximized power conversion efficiency.

Wireless power transfer system transfers electrical power from a power source to an electrical load wirelessly. This system transfers electrical power ranging from microwatts to megawatts. The wireless power transfer system includes an inverter or an amplifier that converts a direct current (DC) signal to an alternating current (AC) signal, a transmitting (Tx) resonator, a receiving (Rx) resonator, and a rectifier. The rectifier converts the AC signal to DC signal and supplies power to the load directly. The wireless power transfer system is desired to keep a high power conversion efficiency when the load impedance fluctuates.

Example embodiments continuously, continually, or periodically adjust the driver of the amplifier and the shunt capacitance of the amplifier in order to improve the wireless power conversion efficiency in response to a variation of the load impedance.

One example embodiment is a wireless power transfer system for power transfer to a load having an impedance that is variable. The wireless power transfer system includes an inverter or an amplifier, a zero voltage switching (ZVS) tank, a shunt capacitor array, an evaluation circuit, and a controller. The amplifier has transistors driven by a gate driving signal with a duty cycle.

The shunt capacitor array is connected with the amplifier and has a tunable capacitance. The evaluation circuit calculates a power conversion efficiency of the system. The controller generates control signals based on the calculated efficiency to adjust the duty cycle of the gate driving signal and to adjust the capacitance of the shunt capacitor array in order to maximize the power conversion efficiency of the system.

In one example embodiment, the amplifier is a half-bridge circuit. The half-bridge circuit includes one high-side transistor and one low-side transistor that are driven by a gate driving signal. The drain of the high-side transistor is connected with a voltage source. The source of the high-side transistor is connected with the drain of the low-side transistor at a switching node.

In another example embodiment, the amplifier is a full-bridge circuit. The full-bridge circuit includes two high-side transistors and two low-side transistors that are driven by a gate driving signal. The drain of the high-side transistor is connected with a voltage source. The source of the high-side transistor is connected with the drain of the low-side transistor at a switching node.

The amplifier further includes a shunt capacitor array with a tunable capacitance that is controlled by the controller of the system in response to a varying load impedance. The shunt capacitor array includes a plurality of capacitors connected with each other in parallel. Each capacitor has a switch that is switchable between an open state and a closed state. The switches switch states in response to the control signal from the controller to reach a capacitance value of the shunt capacitor arrays.

By way of example, the controller adjusts the duty cycle of the gate driving signal and the capacitance of the shunt capacitor array based on the load impedance in order to maximize the power conversion efficiency of the wireless power transfer system. The evaluation circuit identifies a variation of the impedance of the load and recommends an adjustment of the duty cycle of the gate driving signal and an adjustment of the capacitance of the shunt capacitor array to the controller.

In one example embodiment, the controller generates control signals based on a lookup table that stores a set of values of the duty cycle of the gate driving signal and capacitance values of the shunt capacitor array. The control signals turn on or turn off one or more switches of the shunt capacitor array to reach one of the capacitance values in the lookup table.

FIG. 1 shows a block diagram of a wireless power transfer system 100 in accordance with an example embodiment.

The wireless power transfer system 100 includes an inverter 110, a driver 120, a shunt capacitor array 130, a zero voltage switching (ZVS) tank 140, a controller 150 and an evaluation circuit 160. A load 170 is wirelessly coupled with the output port of the inverter 110 through resonant coils.

The inverter 110 converts a direct current (DC) signal at an input port of the inverter to an alternating current (AC) signal at an output port of the inverter. By way of example, the output port of the inverter is connected to a Tx resonator, to transfer power from the transmitting source to the load. Resonant coupling induces energy from magnetic fields between the Tx resonator and a Rx resonator. A rectifier connects with the Rx resonator to convert the AC signals from the Rx resonator to DC signals in order to supply DC power to the load.

In one example embodiment, the inverter includes a half-bridge circuit or a full-bridge circuit. The half-bridge circuit includes one high-side transistor and one low-side transistor that are driven by a gate driving signal from the driver 120. The full-bridge circuit includes two high-side transistors and two low-side transistors that are driven by the driver 120.

By way of example, the ZVS tank 140 electrically connects with the inverter 110 and includes capacitors and one or more inductors. The shunt capacitor array 130 has a tunable capacitance that is controlled by the controller 150 in response to a varying load impedance. As one example, the shunt capacitor array 130 includes a plurality of capacitors connected with each other in parallel. Each capacitor has a switch that is switchable between an open state and a closed state. The switches switch states in response to the control signal from the controller 150 to reach a capacitance value.

By way of example, the controller 150 adjusts the duty cycle of the driver 120 and the capacitance of the shunt capacitor array 130 based on the load impedance in order to maximize the power conversion efficiency of the wireless power transfer system 100. The controller is a microcontroller unit (MCU) or a programmable logic device connected with the evaluation circuit 160 that calculates a power conversion efficiency of the wireless power transfer system. The controller receives the power conversion efficiency from the evaluation circuit 160 and generates a first control signal ($Ctrl_1$) to adjust the duty cycle of the driver 120, and a second control signal ($Ctrl_2$) to adjust the capacitance of the shunt capacitor array 130.

In one example embodiment, the evaluation circuit 160 identifies a variation of the impedance of the load 170 and calculates a power conversion efficiency of the system in real time, based on a voltage and a current measured at the load. The evaluation circuit further recommends an adjustment of the duty cycle of the gate driving signal from the driver 120 and an adjustment of the capacitance of the shunt capacitor array to the controller 150.

In one example embodiment, the controller generates control signals based on a lookup table that stores a set of values of the duty cycle of the gate driving signal and capacitance values of the shunt capacitor array. The control signals turn on or turn off one or more switches of the shunt capacitor array to reach one of the capacitance values in the lookup table.

Figure 2:
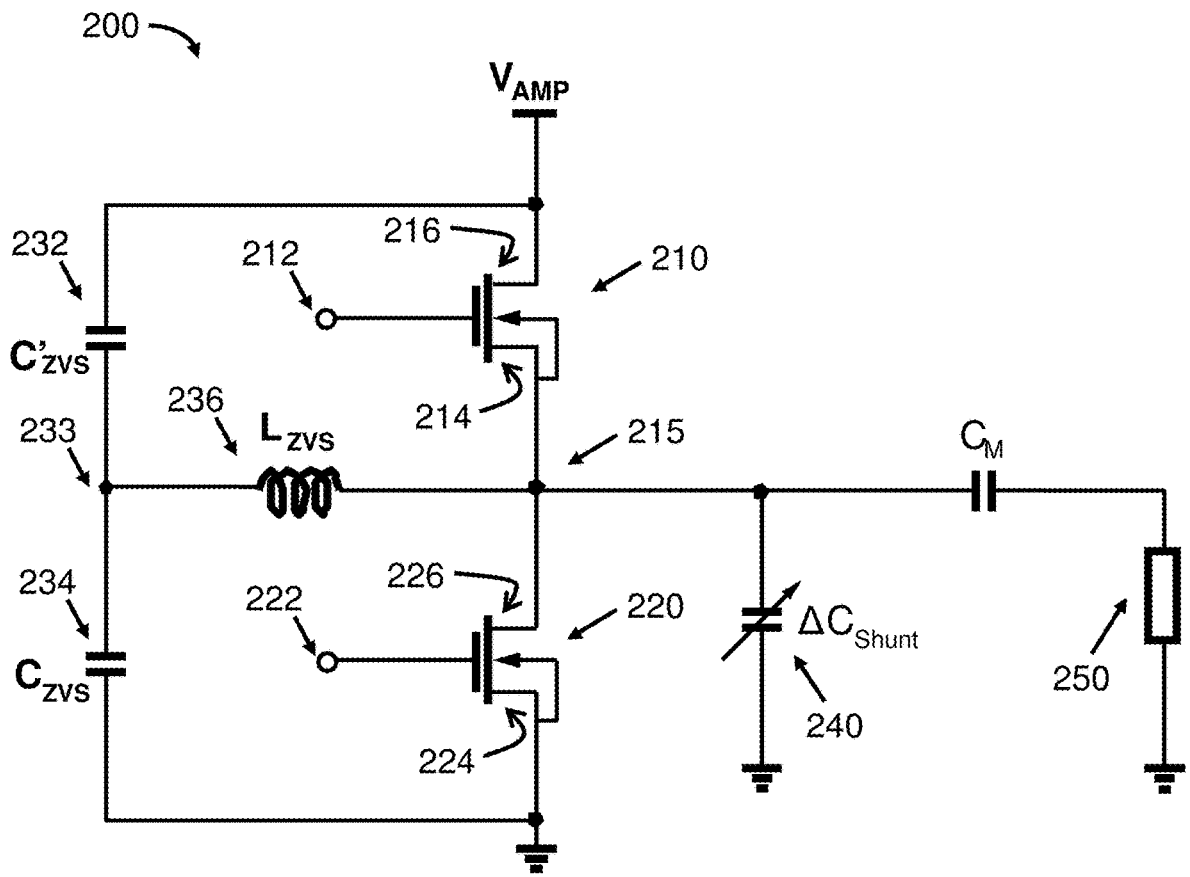
FIG. 2 shows a circuit diagram of a half-bridge circuit in accordance with an example embodiment.

FIG. 2 shows a circuit diagram of a half-bridge circuit 200 in accordance with an example embodiment.

As shown in FIG. 2, the half-bridge circuit 200 includes a high-side transistor 210 and a low-side transistor 220 connected in series. The drain 216 of the high-side transistor 210 is connected with a voltage source $V_{AMP}$. The source 214 of the high-side transistor 210 is connected with the drain 226 of the low-side transistor 220 at the switching note 215. The source 224 of the low-side transistor 220 is grounded. The gate 212 of the high-side transistor 210 and the gate 222 of the low-side transistor 220 are connected with a driver that provides a gate driving signal to the transistors.

The shunt capacitor array 240 is connected with the switching node 215 at one terminal and grounded at another terminal. The load 250 is connected with the shunt capacitor array 240.

By way of example, the half-bridge circuit 200 further includes a ZVS tank. The ZVS tank includes a first capacitor 232, a second capacitor 234 and an inductor 236. The first capacitor and the second capacitor of the ZVS tank are connected in series at a common node 233. The first capacitor 232 connects with the drain 216 of the high-side transistor 210, and the second capacitor 234 connects with the source 224 of the low-side transistor 220. The inductor 236 connects with the common node 233 at one terminal and with the switching node 215 at another terminal.

Figure 3:
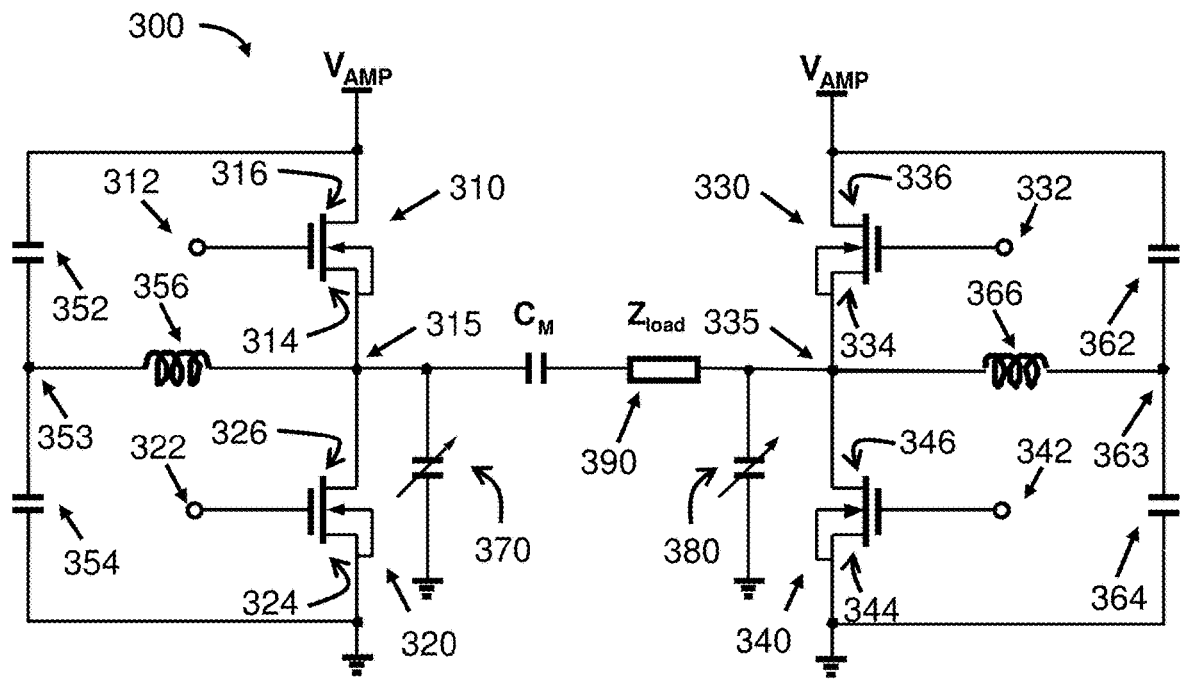
FIG. 3 shows a circuit diagram of a full-bridge circuit in accordance with an example embodiment.

FIG. 3 shows a circuit diagram of a full-bridge circuit 300 in accordance with an example embodiment.

As shown in FIG. 3, the full-bridge circuit 300 includes a high-side transistor 310 and a low-side transistor 320 connected in series. The drain 316 of the high-side transistor 310 is connected with a voltage source $V_{AMP}$. The source 314 of the high-side transistor 310 is connected with the drain 326 of the low-side transistor 320 at the switching note 315. The source 324 of the low-side transistor 320 is grounded. The gate 312 of the high-side transistor 310 and the gate 322 of the low-side transistor 320 are connected with a driver that provides a gate driving signal to the transistors.

The full-bridge circuit 300 further includes a high-side transistor 330 and a low-side transistor 340 connected in series. The drain 336 of the high-side transistor 330 is connected with a voltage source $V_{AMP}$. The source 334 of the high-side transistor 330 is connected with the drain 346 of the low-side transistor 340 at the switching note 335. The source 344 of the low-side transistor 340 is grounded. The gate 332 of the high-side transistor 330 and the gate 342 of the low-side transistor 340 are connected with a driver that provides a gate driving signal to the transistors.

A first shunt capacitor array 370 is connected with the switching node 315 at one terminal and grounded at another terminal. A second shunt capacitor array 380 is connected with the switching node 335 at one terminal and grounded at another terminal. The load 390 is connected with the first shunt capacitor array 370 and the second shunt capacitor array 380.

By way of example, the full-bridge circuit 300 further includes a first ZVS tank and a second ZVS tank. The first ZVS tank includes a first capacitor 352, a second capacitor 354 and an inductor 356. The first capacitor 352 and the second capacitor 354 of the first ZVS tank are connected in series at a common node 353. The first capacitor 352 connects with the drain 316 of the high-side transistor 310, and the second capacitor 354 connects with the source 324 of the low-side transistor 320. The inductor 356 connects with the common node 353 at one terminal and with the switching node 315 at another terminal. The second ZVS tank includes a first capacitor 362, a second capacitor 364 and an inductor 366. The first capacitor 362 and the second capacitor 364 of the second ZVS tank are connected in series at a common node 363. The first capacitor 362 connects with the drain 336 of the high-side transistor 330, and the second capacitor 364 connects with the source 344 of the low-side transistor 340. The inductor 366 connects with the common node 363 at one terminal and with the switching node 335 at another terminal.

Figure 4:
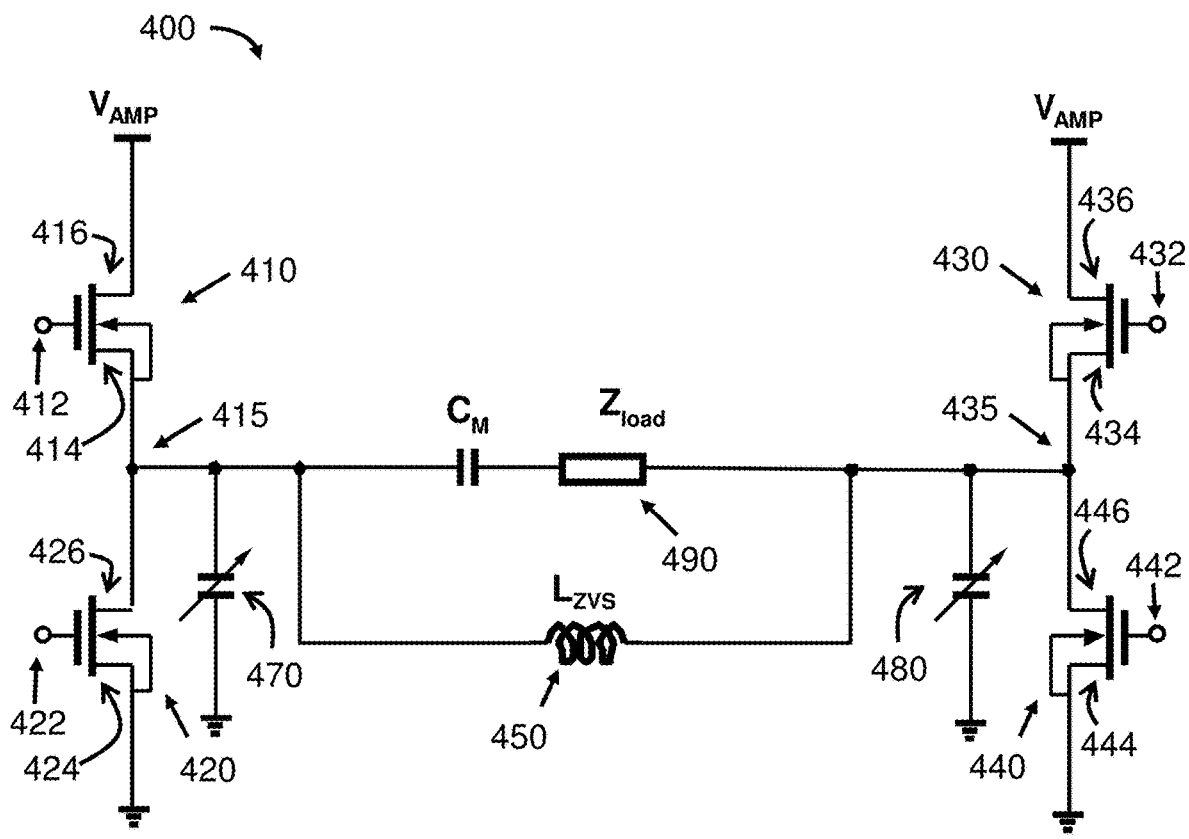
FIG. 4 shows a circuit diagram of a full-bridge circuit in accordance with another example embodiment.

FIG. 4 shows a circuit diagram of a full-bridge circuit 400 in accordance with another example embodiment.

As shown in FIG. 4, the full-bridge circuit 400 includes a high-side transistor 410 and a low-side transistor 420 connected in series. The drain 416 of the high-side transistor 410 is connected with a voltage source $V_{AMP}$. The source 414 of the high-side transistor 410 is connected with the drain 426 of the low-side transistor 420 at the switching note 415. The source 424 of the low-side transistor 420 is grounded. The gate 412 of the high-side transistor 410 and the gate 422 of the low-side transistor 420 are connected with a driver that provides a gate driving signal to the transistors.

The full-bridge circuit 400 further includes a high-side transistor 430 and a low-side transistor 440 connected in series. The drain 436 of the high-side transistor 430 is connected with a voltage source $V_{AMP}$. The source 434 of the high-side transistor 430 is connected with the drain 446 of the low-side transistor 440 at the switching note 435. The source 444 of the low-side transistor 440 is grounded. The gate 432 of the high-side transistor 430 and the gate 442 of the low-side transistor 440 are connected with a driver that provides a gate driving signal to the transistors.

A first shunt capacitor array 470 is connected with the switching node 415 at one terminal and grounded at another terminal. A second shunt capacitor array 480 is connected with the switching node 435 at one terminal and grounded at another terminal. The load 490 is connected with the first shunt capacitor array 470 and the second shunt capacitor array 480.

By way of example, the full-bridge circuit 400 further includes a ZVS tank. The ZVS tank includes inductor 450 that connects with the switching node 415 at one terminal and with the switching node 435 at another terminal.

Figures 5, 6:
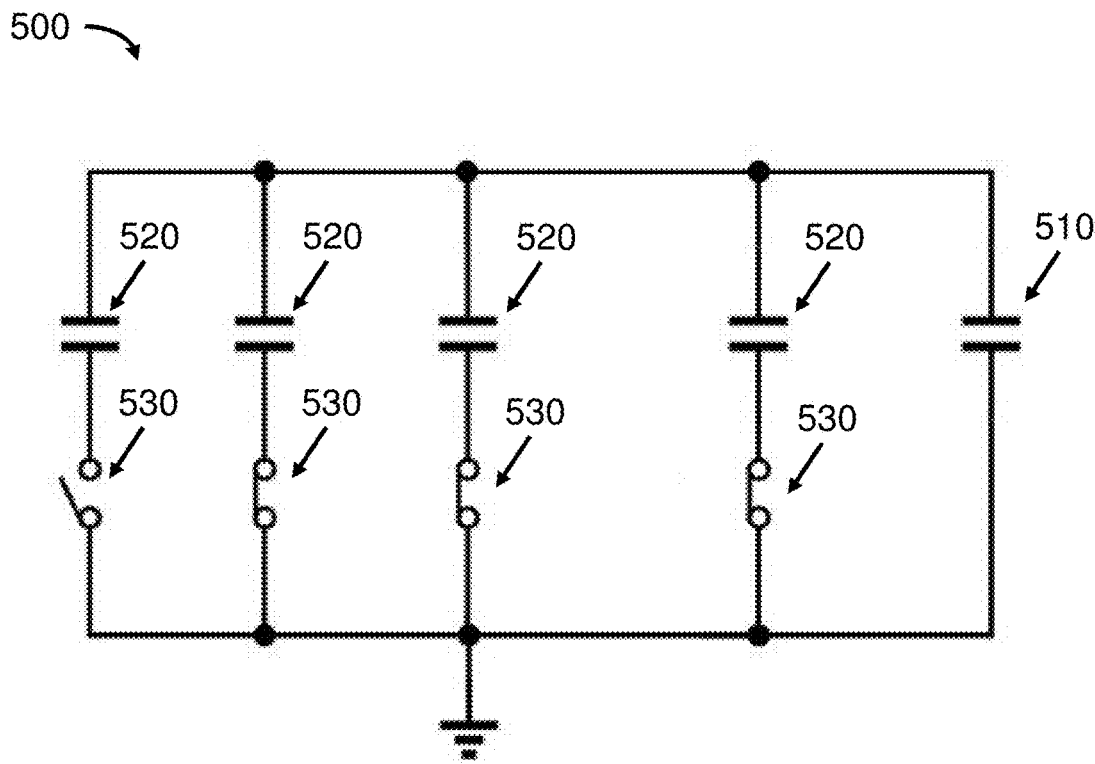
FIG. 5 shows a shunt capacitor array in accordance with an example embodiment.
FIG. 6 shows a lookup table in accordance with an example embodiment.

FIG. 5 shows a shunt capacitor array 500 in accordance with an example embodiment.

By way of example, the shunt capacitor array 500 includes a base capacitor 510 and a plurality of capacitors 520 connected with each other in parallel. Each capacitor 520 is connected with a switch 530 that is switchable between an open state and a closed state. The switches 530 are connected with a controller and can switch states in response to a control signal from the controller to reach a capacitance value of the shunt capacitor array 500.

In one example embodiment, the controller that controls the on or off states of the switches determines the capacitance value of the shunt capacitor array 500 based on a lookup table stored in the controller.

FIG. 6 shows a lookup table 600 in accordance with an example embodiment.

Consider an example in which a controller of an amplifier controls the duty cycle of the gate driving signal of the amplifier and controls a capacitance value of a shunt capacitor array of the amplifier. The shunt capacitor array includes a base capacitor $C_B$ and a plurality of tunable capacitors $C_S$ connected with each other in parallel. Each capacitor $C_S$ is connected with a switch that is switchable between an open state and a closed state, controlled by the controller of the amplifier.

By way of example, the controller generates a first control signal that controls a duty cycle of the gate driving signal and a second control signal that controls the on and off state of the switches, based on the lookup table 600 that stores a set of values of the duty cycle of the gate driving signal and capacitance values of the shunt capacitor array.

In one example embodiment, a pre-set lookup table is stored in a memory of the controller. The lookup table provides a number of capacitance values and duty cycles in response to a varying load impedance. The controller receives an impedance variation from an evaluation circuit and searches in the lookup table to determine a capacitance value of the shunt capacitor array and a duty cycle for the gate driving signal, in order to maximize the power conversion efficiency of the system.

The lookup table that is stored in a controller functions as an index for the controller to find corresponding action. It accelerates the tuning procedure to achieve a high power conversion efficiency in response to a load change.

Figure 7:
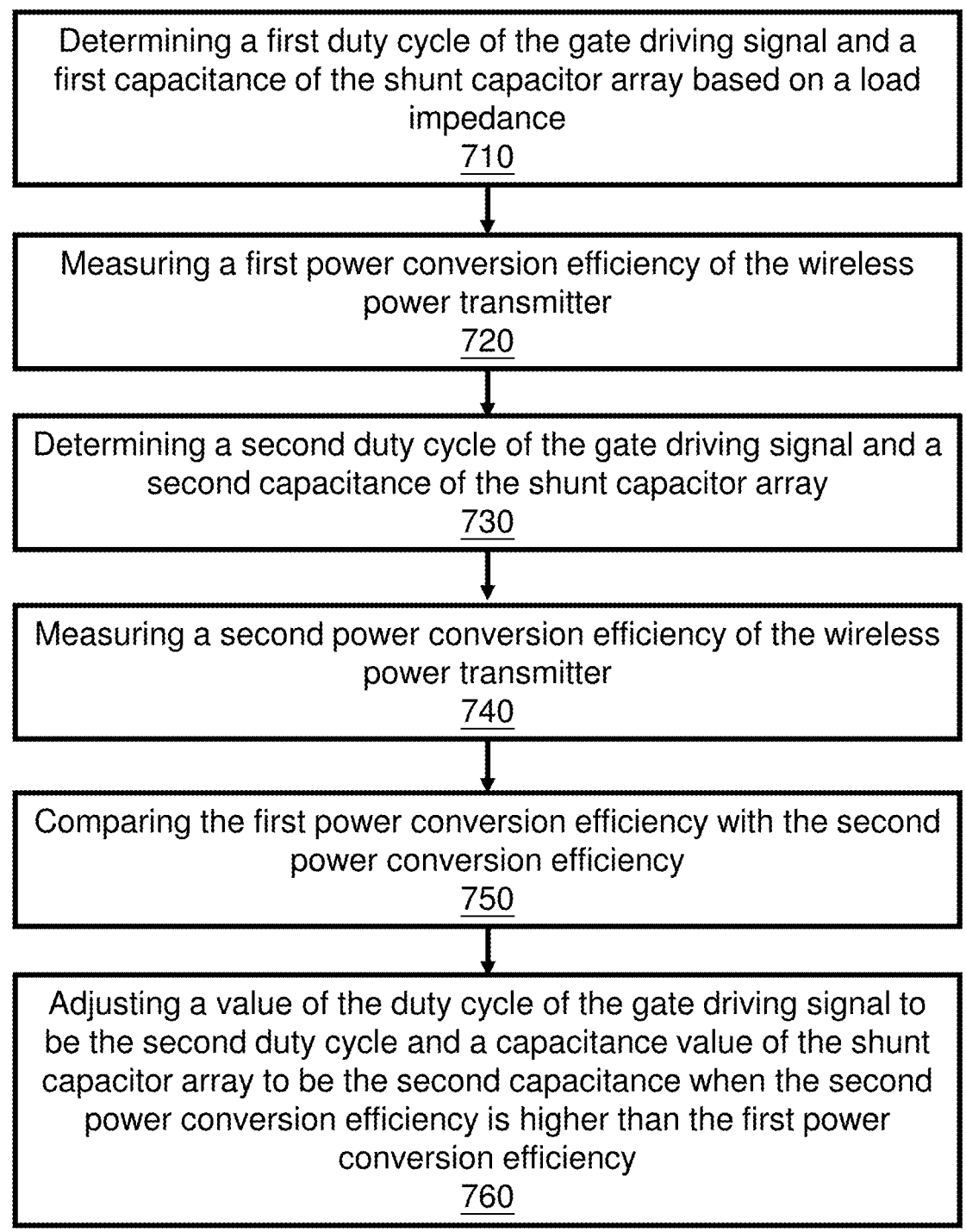
FIG. 7 shows a method executed by a wireless power transfer system in accordance with an example embodiment.

FIG. 7 shows a method executed by a wireless power transfer system in accordance with an example embodiment.

Block 710 states determining a first duty cycle of the gate driving signal and a first capacitance of the shunt capacitor array based on a load impedance.

Consider an example in which a wireless power transmitter includes an inverter, a driver that drives the inverter, a shunt capacitor array connected with the inverter, an evaluation circuit, and a controller that generate control signals based on the feedback from the evaluation circuit. The wireless power transmitter supplies power to a load that is wirelessly coupled with the output port of the inverter. The control determines the duty cycle of the gate driving signal and the capacitance of the shunt capacitor array based on a load impedance of the wireless power transmitter.

In one example embodiment, the inverter includes a half-bridge circuit or a full-bridge circuit. The half-bridge circuit includes one high-side transistor and one low-side transistor that are driven by a gate driving signal from the driver.

The full-bridge circuit includes two high-side transistors and two low-side transistors that are driven by the driver.

Block 720 states measuring a first power conversion efficiency of the wireless power transmitter.

In one example embodiment, the evaluation circuit measures a power conversion efficiency of the wireless power transmitter based on a voltage and a current measured at the load and sends the measured results to the controller of the wireless power transmitter in real time.

Block 730 states determining a second duty cycle of the gate driving signal and a second capacitance of the shunt capacitor array.

In one example embodiment, the evaluation circuit identifies a variation of the impedance of the load and recommends an adjustment to the controller of the wireless power transmitter in real time. The controller determines a second duty cycle of the gate driving signal and a second capacitance of the shunt capacitor array based on a lookup table that stores a set of values of the duty cycle of the gate driving signal and capacitance values of the shunt capacitor array. The lookup table that is stored in the controller functions as an index for the controller to find corresponding action. It accelerates the tuning procedure to achieve a high power conversion efficiency in response to a load change.

Block 740 states measuring a second power conversion efficiency of the wireless power transmitter.

In one example embodiment, the controller determines a second duty cycle of the gate driving signal and a second capacitance of the shunt capacitor array based on a feedback from the evaluation circuit. The evaluation circuit further measures a power conversion efficiency of the wireless power transmitter with the second duty cycle and second capacitance. The measured power conversion efficiency is sent to the controller of the wireless power transmitter in real time.

Block 750 states comparing the first power conversion efficiency with the second power conversion efficiency.

Block 760 states adjusting a value of the duty cycle of the gate driving signal to be the second duty cycle and a capacitance value of the shunt capacitor array to be the second capacitance when the second power conversion efficiency is higher than the first power conversion efficiency.

In one example embodiment, the controller of the wireless power transmitter receives the first and second power conversion efficiencies from the evaluation circuit or from a power receiving unit and compares the first power conversion efficiency with the second power conversion efficiency. If the second power conversion efficiency is higher, then the controller determines a value of the duty cycle of the gate driving signal to be the second duty cycle and a capacitance value of the shunt capacitor array to be the second capacitance. If the second power conversion efficiency is lower, then the controller chooses another the duty cycle of the gate driving signal and another capacitance value of the shunt capacitor array from a lookup table. The process is repeated until the highest power conversion efficiency is achieved.

In one example embodiment, a pre-set lookup table is stored in a memory of the controller. The lookup table provides a number of capacitance values and duty cycles in response to a varying load impedance. The controller receives an impedance variation from an evaluation circuit and searches in the lookup table to determine a capacitance value of the shunt capacitor array and a duty cycle for the gate driving signal, in order to maximize the power conversion efficiency of the system.

By way of example, the shunt capacitor is charged to $V_{amp}$ during the deadtime. The capacitance values $C_{shunt}$ in the lookup table are preterminal by:

$$(C_{Shunt})V_{amp} = \int_{2\pi D}^{\pi}(i_{ZVS})dt'$$

where $V_{amp}$ is a voltage value of a voltage source that is connected with one of the transistors in the amplifier, $i_{ZVS}$ is a current of the inductor of the ZVS tank represented by:

$$i_{ZVS}(t') = i_{Max.} + \int_0^{t'-2\pi D}\left(V_{SW}(t) - \frac{1}{2}V_{amp}\right)/L_{ZVS}dt,$$

where Vsw(t) is the transient response represented by:

$$V_{SW}(t) = -V_{amp}e^{-\alpha t}\left(\cos\omega_d t + \frac{\alpha}{\omega_d}\sin\omega_d t\right) + V_{amp} i_{Max.} \text{ is: } i_{Max.} \approx \frac{V_{amp}}{8f_{SW}L_{ZVS}}$$

where the parameters $\omega_0$, $\alpha$, and $\omega_d$ are:

$\omega_0 = 1/\sqrt{L_{ZVS}C_{shunt}}$, $\alpha = R/2L_{ZVS}$, $\omega_d = \sqrt{\omega_0^2 - \alpha^2}$ In one example embodiment, the controller keeps the duty cycle of the gate driving signal at a first value and increases the capacitance of the shunt capacitor array until the power conversion efficiency of the wireless power transmitter reaches a first maximum value at the first duty cycle. The controller then keeps the duty cycle of the gate driving signal at a second duty cycle and increases the capacitance of the shunt capacitor array until the power conversion efficiency of the wireless power transmitter reaches a second maximum value at the second duty cycle. The controller compares the first maximum value with the second maximum value and determines a duty cycle and a capacitance value that corresponds to the higher value of the power conversion efficiency.

Figure 8:
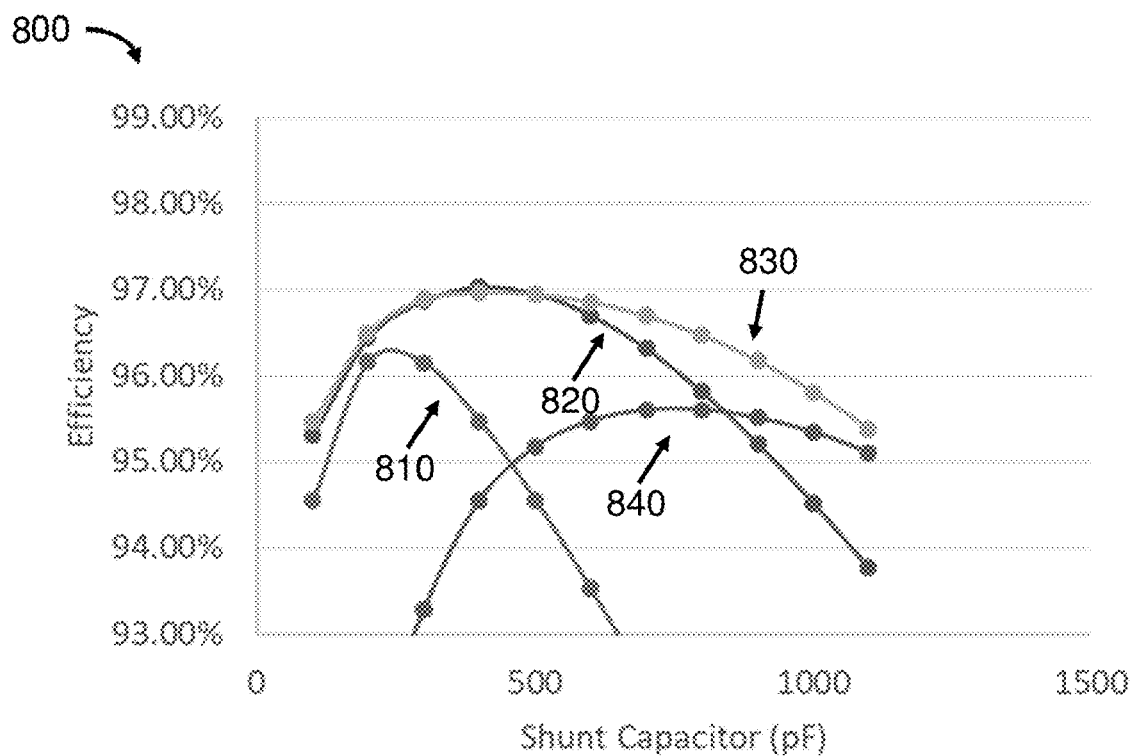
FIG. 8 shows power conversion efficiency of a wireless power transfer system with a 5-ohms load in accordance with an example embodiment.

FIG. 8 shows power conversion efficiency 800 of a wireless power transfer system with a 5-ohms load in accordance with an example embodiment. The X-axis shows capacitance of the shunt capacitor and the Y-axis shows the power conversion efficiency of the system with a 5-ohms load.

Figure 9:
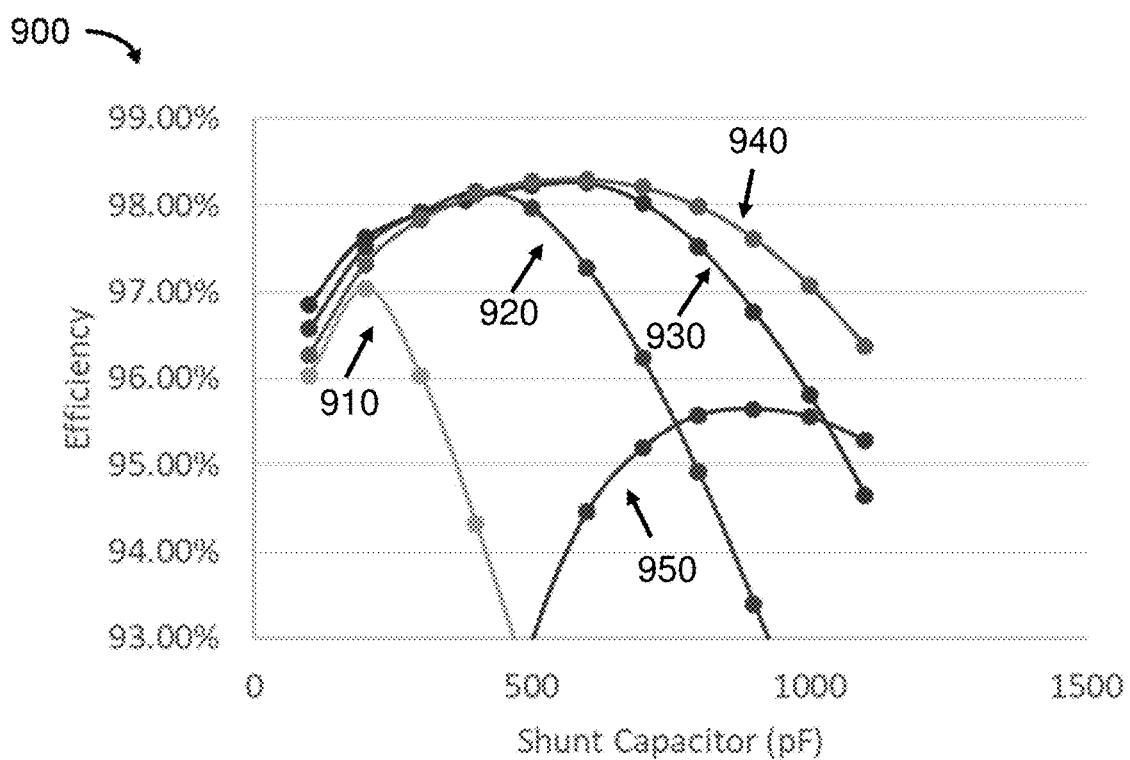
FIG. 9 shows power conversion efficiency of a wireless power transfer system with a 10-ohms load in accordance with an example embodiment.

FIG. 9 shows power conversion efficiency 900 of a wireless power transfer system with a 10-ohms load in accordance with an example embodiment. The X-axis shows capacitance of the shunt capacitor and the Y-axis shows the power conversion efficiency of the system with a 10-ohms load.

Figure 10:
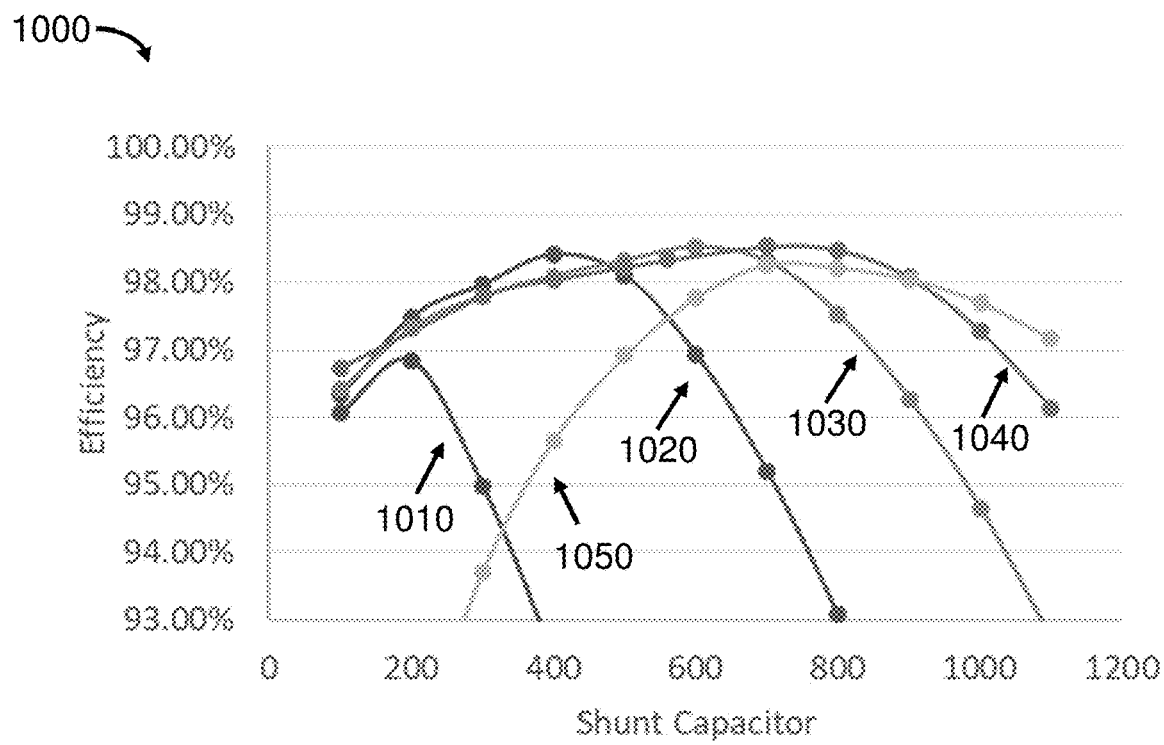
FIG. 10 shows power conversion efficiency of a wireless power transfer system with a 15-ohms load in accordance with an example embodiment.

FIG. 10 shows power conversion efficiency 1000 of a wireless power transfer system with a 15-ohms load in accordance with an example embodiment. The X-axis shows capacitance of the shunt capacitor and the Y-axis shows the power conversion efficiency of the system with a 15-ohms load.

Figure 11:
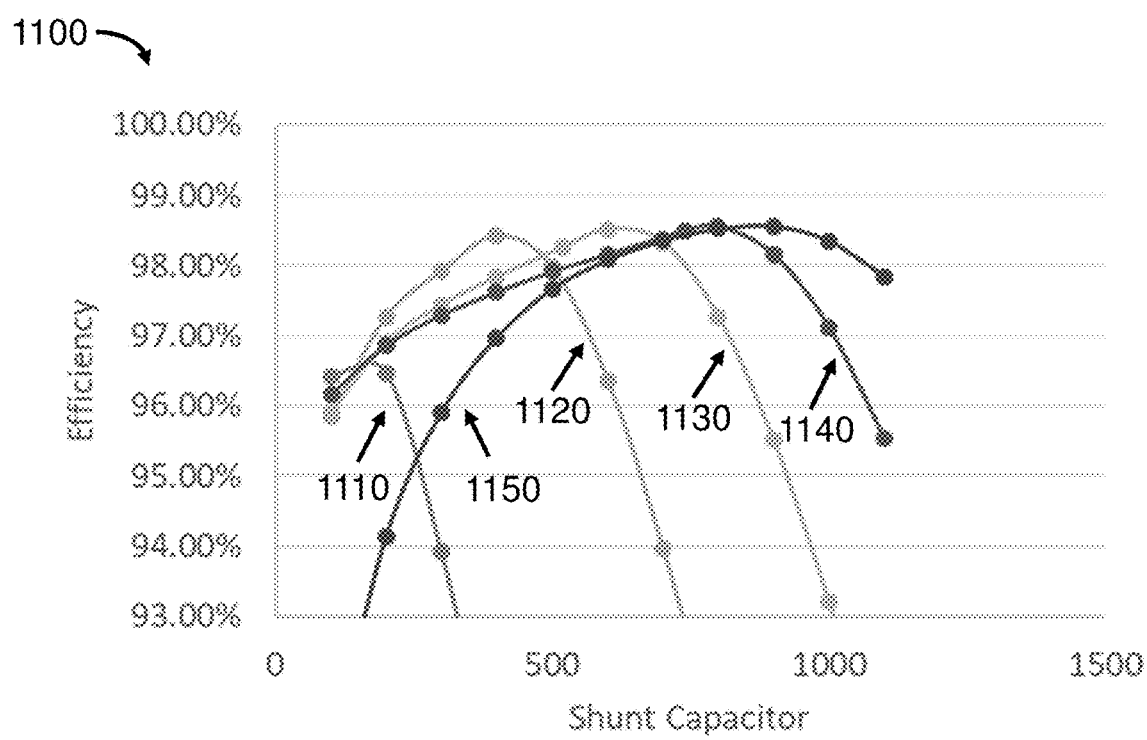
FIG. 11 shows power conversion efficiency of a wireless power transfer system with a 20-ohms load in accordance with an example embodiment.

FIG. 11 shows power conversion efficiency 1100 of a wireless power transfer system with a 20-ohms load in accordance with an example embodiment. The X-axis shows capacitance of the shunt capacitor and the Y-axis shows the power conversion efficiency of the system with a 20-ohms load.

The wireless power transfer system is described in FIG. 1-FIG. 7. The system includes an inverter, a driver that drives the inverter, a shunt capacitor array connected with the inverter, an evaluation circuit, and a controller that generate control signals based on the feedback from the evaluation circuit. The wireless power transmitter supplies power to a load that is wirelessly coupled with the output port of the inverter. The control determines the duty cycle of the gate driving signal and the capacitance of the shunt capacitor array based on a load impedance of the wireless power transmitter.

As shown in FIG. 8, curve 810 shows the power conversion efficiency at a duty cycle of 0.45. Curve 820 shows the power conversion efficiency at a duty cycle of 0.406. Curve 830 shows the power conversion efficiency at a duty cycle of 0.365. Curve 840 shows the power conversion efficiency at a duty cycle of 0.325. The highest power conversion efficiency is 96.97% at a duty cycle of 0.365 and a shunt capacitance of 400 pF, for 5-ohms load impedance.

As shown in FIG. 9, curve 910 shows the power conversion efficiency at a duty cycle of 0.45. Curve 920 shows the power conversion efficiency at a duty cycle of 0.406. Curve 930 shows the power conversion efficiency at a duty cycle of 0.365. Curve 940 shows the power conversion efficiency at a duty cycle of 0.325. Curve 950 shows the power conversion efficiency at a duty cycle of 0.25. The highest power conversion efficiency is 98.28% at a duty cycle of 0.325 and a shunt capacitance of 600 pF, for 10-ohms load impedance.

As shown in FIG. 10, curve 1010 shows the power conversion efficiency at a duty cycle of 0.45. Curve 1020 shows the power conversion efficiency at a duty cycle of 0.406. Curve 1030 shows the power conversion efficiency at a duty cycle of 0.365. Curve 1040 shows the power conversion efficiency at a duty cycle of 0.325. Curve 1050 shows the power conversion efficiency at a duty cycle of 0.25. The highest power conversion efficiency is 98.53% at a duty cycle of 0.325 and a shunt capacitance of 700 pF, for 15-ohms load impedance.

As shown in FIG. 11, curve 1110 shows the power conversion efficiency at a duty cycle of 0.45. Curve 1120 shows the power conversion efficiency at a duty cycle of 0.406. Curve 1130 shows the power conversion efficiency at a duty cycle of 0.365. Curve 1140 shows the power conversion efficiency at a duty cycle of 0.325. Curve 1150 shows the power conversion efficiency at a duty cycle of 0.25. The highest power conversion efficiency is 98.57% at a duty cycle of 0.25 and a shunt capacitance of 900 pF, for 20-ohms load impedance.

Figure 12:
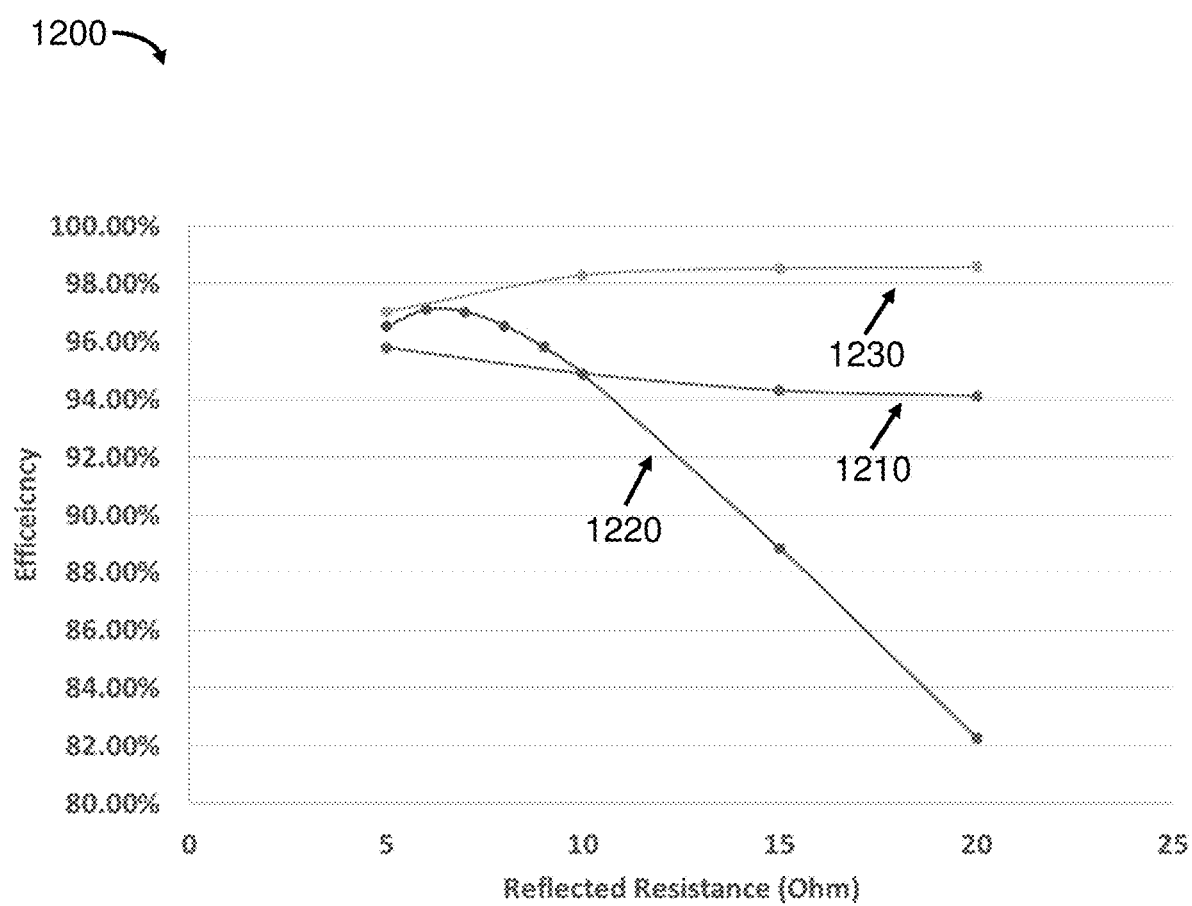
FIG. 12 shows power conversion efficiency of three wireless power transfer systems in accordance with an example embodiment.

FIG. 12 shows a graph 1200 of power conversion efficiency of three wireless power transfer systems in accordance with an example embodiment. The X-axis shows reflective resistance and the Y-axis shows the power conversion efficiency.

By way of example, curve 1210 shows the power conversion efficacy of a system with a ZVS class D inverter. Curve 1220 shows the power conversion efficacy of a system with a class DE inverter but without a controller that adjusts the duty cycles and the capacitance values for the class DE inverter based a varying load impedance. Curve 1230 shows the power conversion efficacy of a system with a class DE inverter with a controller that adjusts the duty cycles and the capacitance values, as described in FIG. 1-FIG. 7. It can be seen that curve 1230 achieves high power conversion efficiency (more than 97%) for load impedance from 5 ohms to 20 ohms.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

As used herein, a "wireless power transfer system" or "wireless power transmitter" is a system or a transmitter that transfers electrical energy to an electrical load wirelessly.

As used herein, a "high-side transistor" is a transistor with a drain connected to a voltage source and with a source connected to a drain of another transistor.

As used herein, a "low-side transistor" is a transistor with a drain connected to a source of another transistor and with a source connected to ground.

What is claimed is:

1. A wireless transfer system with an inverter that converts a direct current (DC) signal to an alternating current (AC) signal for wireless power transfer to a load having an impedance that is variable, the wireless transfer system comprising:
    a full-bridge circuit having at least four transistors with each of the four transistors driven by a gate driving signal with a duty cycle;
    a zero voltage switching (ZVS) tank electrically connected with the full-bridge circuit;
    a first shunt capacitor array and a second shunt capacitor array each electrically connected with the full-bridge circuit and having a tunable capacitance;
    an evaluation circuit that calculates a power conversion efficiency of the electronic system; and
    a controller that receives the power conversion efficiency from the evaluation circuit and generates a first control signal to adjust the duty cycle of the gate driving signal and a second control signal to adjust the tunable capacitance of the first and capacitance values of the shunt capacitor array, wherein the first control signal corresponds to one of the values of the duty cycle in the lookup table, and wherein the second control signal turns on or off one or more switches of the shunt capacitor array to achieve one of the capacitance values in the lookup table,
    second shunt capacitor arrays in order to maximize the power conversion efficiency of the electronic system,
    wherein the controller generates the first and second control signals based on a lookup table that stores a set of values of the duty cycle of the gate driving signal and capacitance values of the shunt capacitor array, wherein the first control signal corresponds to one of the values of the duty cycle in the lookup table, and wherein the second control signal turns on or off one or more switches of the shunt capacitor array to achieve one of the capacitance values in the lookup table.

2. The electronic system of claim 1, wherein the full-bridge circuit includes:
    a first high-side transistor having a drain that is connected with a voltage source;
    a first low-side transistor having a drain that is connected with a source of the first high-side transistor at a first switching node;
    a second high-side transistor having a drain that is connected with the voltage source; and
    a second low-side transistor having a drain that is connected with a source of the second high-side transistor at a second switching node,
    wherein the first shunt capacitor array is connected with the first switching node at one terminal and grounded at another terminal, and
    wherein the second shunt capacitor array is connected with the second switching node at one terminal and grounded at another terminal.

3. The electronic system of claim 1, wherein the full-bridge circuit includes:

a first high-side transistor having a drain that is connected with a first voltage source;

a first low-side transistor having a drain that is connected with a source of the first high-side transistor at a first switching node and having a source that is grounded;

a second high-side transistor having a drain that is connected with the voltage source; and a second low-side transistor having a drain that is connected with a source of the second high-side transistor at a second switching node and having a source that is grounded, wherein the ZVS tank includes:

a first ZVS tank having a first inductor and two capacitors connected in series at a first common node, wherein one of the two capacitors connects with the drain of the first high-side transistor, another one of the two capacitors connects with the source of the first low-side transistor, and wherein the first inductor connects with the first common node at one terminal of the first inductor and with the first switching node at another terminal of the first inductor; and a second ZVS tank having a second inductor and two capacitors connected in series at a second common node, wherein one of the two capacitors connects with the drain of the second high-side transistor, another one of the two capacitors connects with the source of the second low-side transistor, and wherein the second inductor connects with the second common node at one terminal of the second inductor and with the second switching node at another terminal of the second inductor.

4. The electronic system of claim 1, wherein each of the first and second shunt capacitor arrays includes a plurality of capacitors connected with each other in parallel, each capacitor having a switch that is switchable between an open state and a closed state, and switches states in response to the second control signal from the controller to reach a capacitance value of the first and second shunt capacitor arrays.

5. The electronic system of claim 1, wherein the evaluation circuit identifies a variation of the impedance of the load and recommends an adjustment of the duty cycle of the gate driving signal and an adjustment of the capacitance of the shunt capacitor array to the controller of the inverter such that the controller adjusts the duty cycle of the gate driving signal and the capacitance of the shunt capacitor array to maximize the power conversion efficiency of the electronic system.

6. A method of tuning a power conversion efficiency of a wireless power transmitter that includes an amplifier having at least two transistors each
driven by a gate driving signal, a zero voltage switching (ZVS) tank having an inductor, a shunt capacitor array, and a controller, the method comprising:

determining a first duty cycle of the gate driving signal and a first capacitance of the shunt capacitor array based on a load impedance;

measuring a first power conversion efficiency of the wireless power transmitter; determining a second duty cycle of the gate driving signal and a second capacitance of the shunt capacitor array;

measuring a second power conversion efficiency of the wireless power transmitter;

comparing the first power conversion efficiency with the second power conversion efficiency;

adjusting a value of the duty cycle of the gate driving signal to be the second duty cycle and a capacitance value of the shunt capacitor array to be the second capacitance when the second power conversion efficiency is higher than the first power conversion efficiency;

keeping a duty cycle of the gate driving signal to be the second duty cycle when the second power conversion efficiency is higher than the first power conversion efficiency;

keeping a duty cycle of the gate driving signal to be the first duty cycle when the second power conversion efficiency is lower than the first power conversion efficiency; and increasing the capacitance of the shunt capacitor array until the power conversion efficiency of the wireless power transmitter reaches a maximized value.

7. The method of claim 6, wherein the controller generates control signals to adjust a duty cycle of the gate driving signal and a capacitance value of the shunt capacitor array based on a lookup table that stores a set of values including duty cycles of the gate driving signal and capacitance values of the shunt capacitor array, the capacitance values $C_{shunt}$ are preterminal by:

$$(C_{Shunt})V_{amp} = \int_{2\pi D}^{\pi} (i_{ZVS})dt^i$$

where $V_{amp}$ is a voltage value of a voltage source that is connected with one of the transistors in the amplifier, $i_{ZVS}$ is a current of the inductor of the ZVS tank.

8. The method of claim 6, wherein the wireless power transmitter further includes a power receiving unit that identifies a variation of a load impedance and recommends an adjustment of the duty cycle of the gate driving signal and an adjustment of the capacitance value of the shunt capacitor array to the controller of the wireless power transmitter such that the controller adjusts the duty cycle of the gate driving and the capacitance of the shunt capacitor array to maximize the power conversion efficiency of the wireless power transmitter.

9. The method of claim 6, wherein the shunt capacitor array includes a plurality of capacitors connected with each other in parallel, each capacitor having a switch that is switchable between an open state and a closed state, and wherein the switches switch states in response to a control signal from the controller, wherein the control signal is generated by the controller such that the shunt capacitor array reaches the second capacitance when the second power conversion efficiency is higher than the first power conversion efficiency.

10. The method of claim 6, wherein the amplifier includes a full-bridge circuit that includes:

a first high-side transistor having a drain that is connected with a first voltage source and a gate that is driven by a driver with a variable duty cycle;

a first low-side transistor having a drain that is connected with a source of the first high-side transistor at a first switching node, a source that is grounded and a gate that is driven by a driver with a variable duty cycle;

a second high-side transistor having a drain that is connected with the voltage source and a gate that is driven by a driver with a variable duty cycle; and a second low-side transistor having a drain that is connected with a source of the second high-side transistor at a second switching node, a source that is grounded, and a gate that is driven by a driver with a variable duty cycle, wherein a first shunt capacitor array is connected with the first switching node at one terminal and grounded at another terminal, wherein a second shunt capacitor array is connected with the second switching node at one terminal and grounded at another terminal, and wherein the first or the second shunt capacitor array has a tunable capacitance.

11. The method of claim 10, wherein the ZVS tank further comprises:

a first ZVS tank having a first inductor and two capacitors connected in series at a first common node, wherein one of the two capacitors connects with the drain of the first high-side transistor, another one of the two capacitors connects with the source of the first low-side transistor, and wherein the first inductor connects with the first common node at one terminal of the first inductor and with the first switching node at another terminal of the first inductor; and a second ZVS tank having a second inductor and two capacitors connected in series at a second common node, wherein one of the two capacitors connects with the drain of the second high-side transistor, another one of the two capacitors connects with the source of the second low-side transistor, and wherein the second inductor connects with the second common node at one terminal of the second inductor and with the second switching node at another terminal of the second inductor.

* * * * *